United States Patent [19]

Micic et al.

[11] Patent Number: 4,729,028

[45] Date of Patent: Mar. 1, 1988

[54] TELEVISION RECEIVER WITH MULTIPICTURE DISPLAY

[75] Inventors: Ljubomir Micic, Freiburg; Soenke Mehrgardt, March-Neuershausen, both of Fed. Rep. of Germany

[73] Assignee: Deutsche ITT Industries GmbH, Freiburg, Fed. Rep. of Germany

[21] Appl. No.: 916,169

[22] Filed: Oct. 7, 1986

[30] Foreign Application Priority Data

Oct. 10, 1985 [EP] European Pat. Off. ........ 85112824.9

[51] Int. Cl.⁴ .................... H04N 5/272; H04N 5/262
[52] U.S. Cl. ........................................ 358/183; 358/22
[58] Field of Search ................. 358/183, 22, 182, 181

[56] References Cited

U.S. PATENT DOCUMENTS

| | | | |
|---|---|---|---|
| 3,207,842 | 9/1965 | Flagle | 358/183 |
| 4,139,860 | 2/1979 | Micic et al. | 358/183 X |
| 4,238,773 | 12/1980 | Tsuboha et al. | 358/183 |
| 4,266,242 | 5/1981 | McCoy | 358/183 X |
| 4,267,560 | 5/1981 | Ishikawa et al. | 358/22 |
| 4,278,993 | 7/1981 | Suzuki | 358/22 |
| 4,636,864 | 1/1987 | Annegarn et al. | 358/183 X |
| 4,656,515 | 4/1987 | Christopher | 358/183 |
| 4,656,516 | 4/1987 | Fling et al. | 358/183 |
| 4,665,438 | 5/1987 | Miron et al. | 358/181 X |

FOREIGN PATENT DOCUMENTS 2413839  3/1974  Fed. Rep. of Germany .
1495173 12/1977  Fed. Rep. of Germany .

OTHER PUBLICATIONS

"VMC Video Memory Controller", Aug. 1985–Intermetall Semiconductors ITT.

*Primary Examiner*—James J. Groody
*Assistant Examiner*—E. Anne Faris
*Attorney, Agent, or Firm*—T. L. Peterson

[57] ABSTRACT

The output signal of one tuner or of other TV signal sources in the base band are digitized and stored in a part of a memory. After automatic switching over to another TV-channel, this new signal is stored in another part of the memory and so on. The whole memory is then read out continuously and produces the displayed multipicture on the screen.

7 Claims, 5 Drawing Figures

TELEVISION RECEIVER WITH MULTIPICTURE DISPLAY

BACKGROUND OF THE INVENTION

The invention pertains to a television receiver. More specifically, the present invention pertains to a television receiver with a multipicture display.

In a television receiver with multipicture display a single video signal can be reproduced simultaneously in two or more subareas, or two or more different video signals can each be reproduced in associated subareas. Each of the subareas can display either a reduced-size picture or a part of the picture supplied by a video-signal source. A digital signal-processing circuit converts the signals from the video-signal source to picture data consisting of luminance and color data for each picture element. A random-access memory (RAM) holds the picture data of the entire screen. A control unit controls the writing of the picture data into an area of the RAM depending on the number of video signals to be reproduced and the line-by-line readout, with only selected lines being transferred from the video-signal source into the associated memory area. A digital-to-analg converted which is furnished with the picture data read from the RAM delivers the analog red, green, and blue signals.

A television receiver of this kind is described in a printed publication by Intermetall Semiconductors ITT, "VMC Video Memory Controller", August 1985.

That television receiver circuit uses random-access memories (RAMs). For the multipicture display, the screen is divided into up to nine equal-sized subareas which each contain a part of a picture of normal size or a complete picture of reduced size. In that mode, successively produced "snapshots" of up to nine different video signals can be displayed simultaneously. The switching of the video signals takes place manually.

Offenlegungsschrift DE No. 24 13 839 A1 describes a circuit for a television receiver with a facility for simultaneously reproducing two or more programs. In a part of the picture of the directly received main program, the secondary program, received with a single switchable tuner, is stored in a memory with a reduced number of lines and is called up line by line when the electron beam of the picture tube sweeps across the predetermined part of the picture. The disadvantage of this method lies in horizontal grating-like interference in the main picture which results from the fact that lines of the main picture are missing at regular intervals when the tuner has been switched to the secondary program, and which can only be incompletely compensated.

SUMMARY OF THE INVENTION

Accordingly, the problem to be solved by the invention is to provide a circuit of the above kind with which the grating-like interference caused during reproduction using the above-described single-tuner switching method is eliminated.

The output signal of one tuner or of other TV signal sources in the base band are digitize and stored in part of a memory. After automatic switching over to another TV-channel, this new signal is stored in another part of the memory and so on.

The whole memory is then read out continuously and produces the multi-picture display on the screen. Another advantage consists in the fact that, for the construction of the whole screen picture, all picture data are withdrawn from the RAM, so that the usual picture-improvement techniques can be applied. By fast readout from the memory rows, the displayed picture is freed from both line flicker and background flicker.

By changing the sampling rates of the different video-signal sources, it is readily possible to monitor the latter, nearly up to the still picture. In an arrangement in accordance with the invention digital picture processing and digital storage are used thereby permitting the circuit to process analog or digital signals, from video signal sources.

BRIEF DESCRIPTION OF THE DRAWING

The invention will be better understood from a reading of the following detailed description in conjunction with the drawing in which.

DETAILED DESCRIPTION

Figure 1:
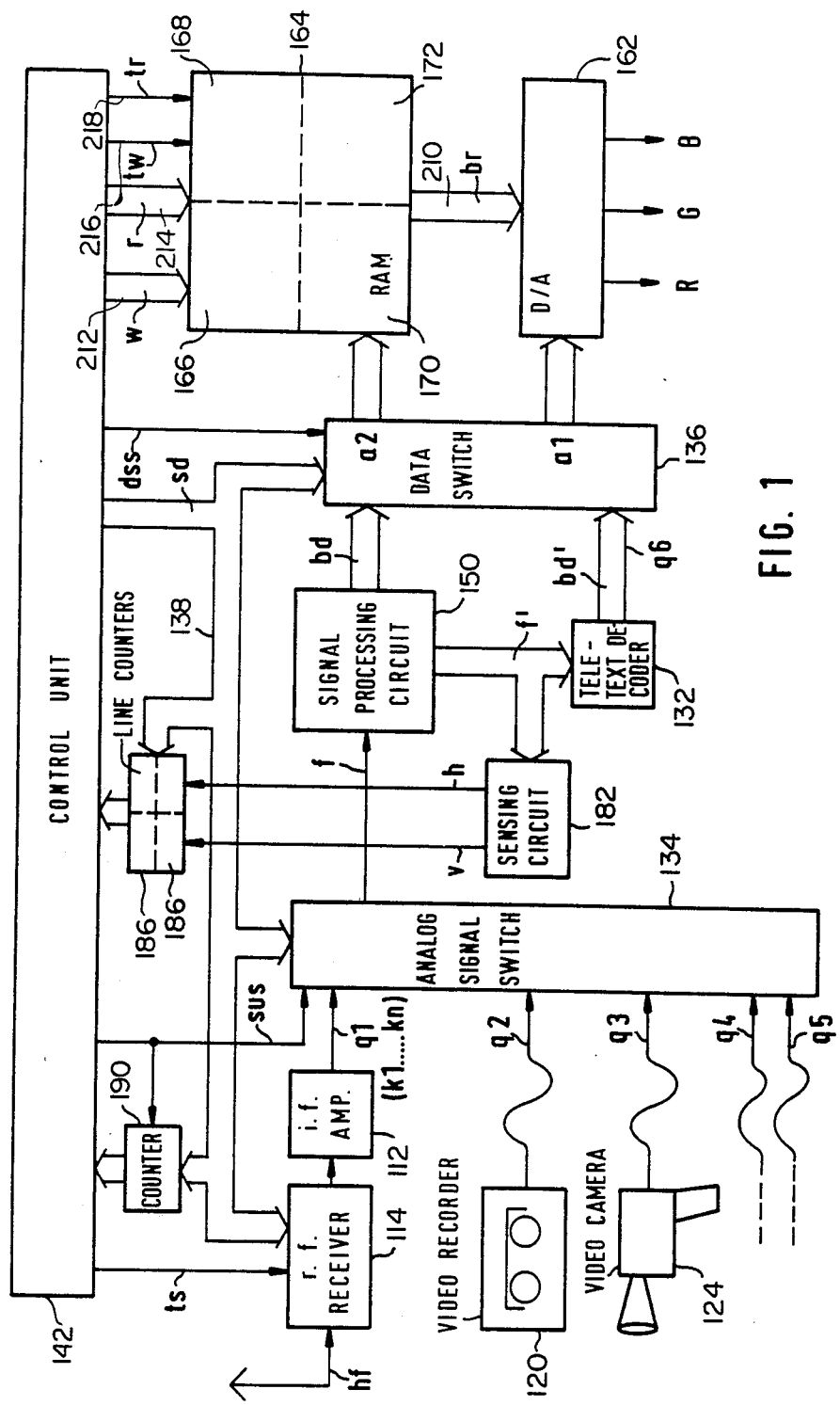
FIG. 1 is a block diagram of a simplified embodiment of a television receiver with multipicture display in accordance with the invention.

In the simplified block diagram of FIG. 1, the video-signal sources suitable for the multipicture display are as follows: q1 is the respective signal of a television channel k1 ... kn which is the output signal of the inermediate-frequency amplifier 112, which follows the radio-frequency receiver 114, that contains a single tuner and is supplied with the antenna signal hf; q2 is the output signal of 120 the video recorder; q3 is the output signal of 124 the video camera; q4 and q5 are the output signal of two further terminals (not shown) to which a source such as computer or a videotext set can be connected; q6 is the output signal of the teletext decoder 132. The video-signal q1 can provide alternately different television channels k1, k2 ... if the tuner is switched in a suitable manner.

The video-signals q1 ... q5 are connected to the input sockets of the analog signal switch 134. The output of the teletext decoder 132 is connected internally to one input of the data switch 136. The signal switch 134 and the data switch 136 are controlled via the control bus 138, which carries the control data sd derived by the control unit 142.

The selection of the different television channels contained in the antenna signal hf takes place in the radio-frequency receiver 114, which contains a frequency-programable tuner. Control data sd which designates the respective television channel to be selected is fed to the tuner over the control bus 138 and prepares the tuner for switching. The actual and very fast switching of the tuner is effected by the tuner switching signal ts, which is produced by the control unit 142. A corresponding switching signal, the switching signal sus, is applied to the signal switch, and an additional signal from the control unit, the digital switching signal dss, controls the switching of the data switch 136. With switching signals ts, sus, and dss, accurate and fast switching is possible.

The composite color signal output f of the signal switch 134, is fed to the input of the digital signal-processing circuit 150. The latter delivers the picture data bd, consisting of the (R-Y) signal and the (B-Y) signal (R=red, B=blue, Y=luninance). The picture data bd from the digital signal processing circuit 150 and the picture data bd' from the teletext decoder 132 are fed respectively to two inputs of the data switch 136. The latter has two outputs a1, a2, which are switched by the control unit 142. In the normal mode, without multipicture display, the output signals of the data switch 136 are transferred from the output a1 directly to the digital-to-analog converter 162, which also contains the R-G-B matrix and delivers the analog R, G, and B signals (G=green), which are fed to the output amplifiers and then to the individual color cathodes of the picture tube. In the multipicture display mode, the digital-to-analog converter 162 is fed with the picture data br read from the RAMs, the latter being designed to have the capability of being written into and read from simultaneously.

The other output a2 of the data switch 136 feeds the RAM 164, which is divided into four areas 166, 168, 170, 172 in this embodiment. The division is only an imaginary or address-related division and is to illustrate a four-picture display. The simultaneous writing and reading of the picture data bd, bd' into and out of the RAM 164 is controlled by the control unit 142, which transfers addresses w and read addresses r over separate address buses. The control unit 142 also supplies the RAM 164 with the write signal tw and the read signal tr, which may differ in frequency. This depends on whether, in the multipicture display mode, the video-signal sources are to be presented reduced in size, as a section in the same picture size, or even as an enlarged section. In addition, the clock frequency depends on whether, during a multipicture display, the picture is to be flicker-free, because the individual television lines are then written on the screen at an increased scanning speed, which necessitates reading the individual lines from the RAM 164 at a correspondingly higher speed.

A further output signal of the digital signal-processing circuit 150, which corresponds to the digital composite color signal f', is fed to the teletext decoder 132 and the sensing circuit 182. The latter separates the horizontal synchronizing pulses and any vertical synchronizing pulses from the digital composite color signal f' in the respective receive cycle and feeds a line pulse h to one of the line counters 186 associated with the respective video-signal source or television channel. The contents of the selected one of the line counters 186 are fed to the control unit 142. The line counters 186 are advanced during the different receive periods so that, at the beginning of a receive period, the respective line counter has the count which corresponds to the line being received. This advance is controlled by the control unit 142. In this manner, line synchronism with the respective video-signal source or the television channel is achieved which is independent of whether the video-signal source or the television channel is connected to the RAM 164. Only with this exact synchronism is it possible to ensure that, despite the video-signal-source or television-channel switching, the corresponding scanning line is written at the correct location of the RAM 164 and that the beginning of this line is placed at the beginning of the respective memory-area row. A receive period thus starts with the beginning of a complete scanning line and continues at least for the duration of that line.

If the respective receive period contains a vertical synchronizing pulse, the sensing circuit 182 supplies the vertical pulse v to the respective one of the line counters 186 which uses it to synchronize the counting of the individual lines.

The control unit 142 is also suppied with the contents of the signal-source counter 190, which is advanced with the switching of the video signals. The signal-source counter 190 is a sort of ring counter whose number of states is equal to the number of video signals to be reproduced.

If either alternate even and odd-numbered fields or only like fields are to be tranferred into the respective memory area ss . . . , the signal-source counter 190 may be designed accordingly, e.g., by increasing the number of counter states to an even-or-odd-number value.

During the multipicture display, line flicker or background flicker can be eliminated by suitable techniques, as described in the above prior art. Jerky movements of the picture content in the case of video signals with moving picture content are unavoidable. However, this impairment is reduced by the reduced-size display of the video signals in subareas 192, 194, 196, 198 of the screen 200. However, the effect increases as the number of video signals contributing to the construction of the picture increases. It is therefore an advantage if the average receive periods of the video signals are not equal to each other but are individually adjustable. With this, a less important video-signal q3, which originates from a camera, or a less important channel k . . . can be switched to the signal switch 134 only at a very low repetition rate. The receive periods thus remaining vacant can be used for another video-signal source, which can then provide a nearly jerk-free picture. For this specific control, a signal-source counter 190 in connection with the control unit 142 is required. The signal-source counter 190 thus has its input connected to the control bus 138 and is supplied with a switching signal, here the switching signal sus, and its output is fed to the control unit 142.

The durations of the individual receive periods, which are normally about equally long within a switching cycle and do not exceed the duration of a received field, are changed by the individual switch over so that individual receive periods occur which may comprise more than one field. In exchange, receive periods for other video signals become shorter or even are skipped completely.

Between the digital signal-processing circuit 150 and the RAM 164 a filter circuit may be provided which compresses the picture data bd, whereby the size of the RAM 164 can be reduced.

Another advantage of such filter circuits is a horizontal and vertical interpolation of the selected scanning lines of the respective video signal, which permits improved picture reproduction in the subareas 192, 194, 196, 198 and horizontal structures occur in the respective video signal, these structures may be present or absent in the read-out picture data br as a result of the selection of the picture elements stored in the memory area 166, 168, 170, 172, thus interfering with the picture reproduction. The interpolation eliminates this interference, which may also appear as moire.

Figure 2:
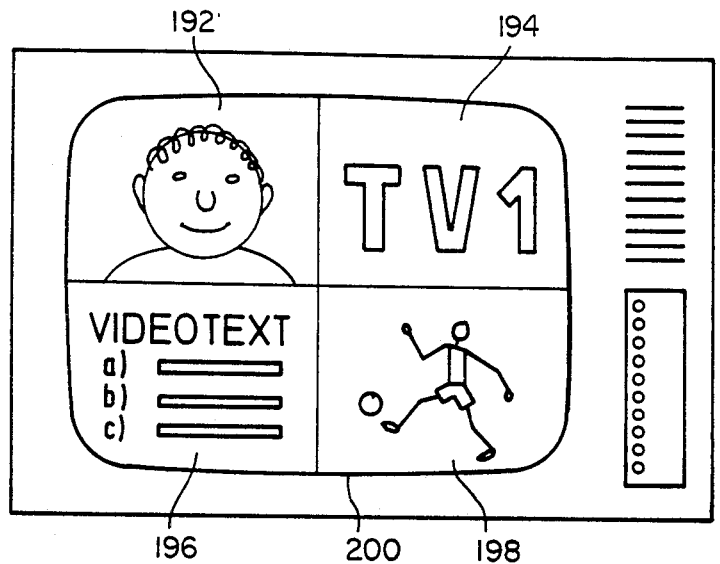
FIG. 2 illustrates the division of the screen in the multipicture display mode.

FIG. 2 shows a typical multipicture display on the screen 200 of a television set which is divided into four subareas 192, 194, 196, 198 in accordance with the embodiment of FIG. 1. In the first subarea 192 and the second subarea 194, pictures of two different television channels k1, k2 are shown. The third subarea 196 shows a videotext page as is delivered by the video-signal q6, while in the fourth subarea 198, the recorded signal of the video recorder 120 is being reproduced. In all four subareas, the images of the different video-signal sources are reduced in size.

In the display in the second subarea 194, the frame frequency can be reduced, for this area only serves to check when a particular program, e.g., a film, begins. The videotext page in the third subarea 196 can be stored as a still picture; the frame frequency is thus increased for the first and fourth subareas 192, 198.

Figure 3B:
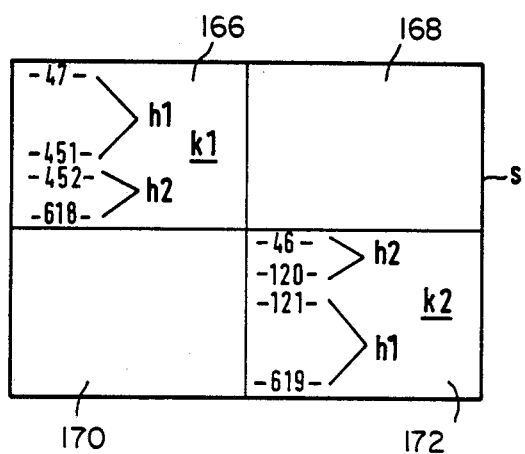
FIG. 3b shows schematically the division of the RAM if the sampling scheme of FIG. 3a is used.
Figure 3A:
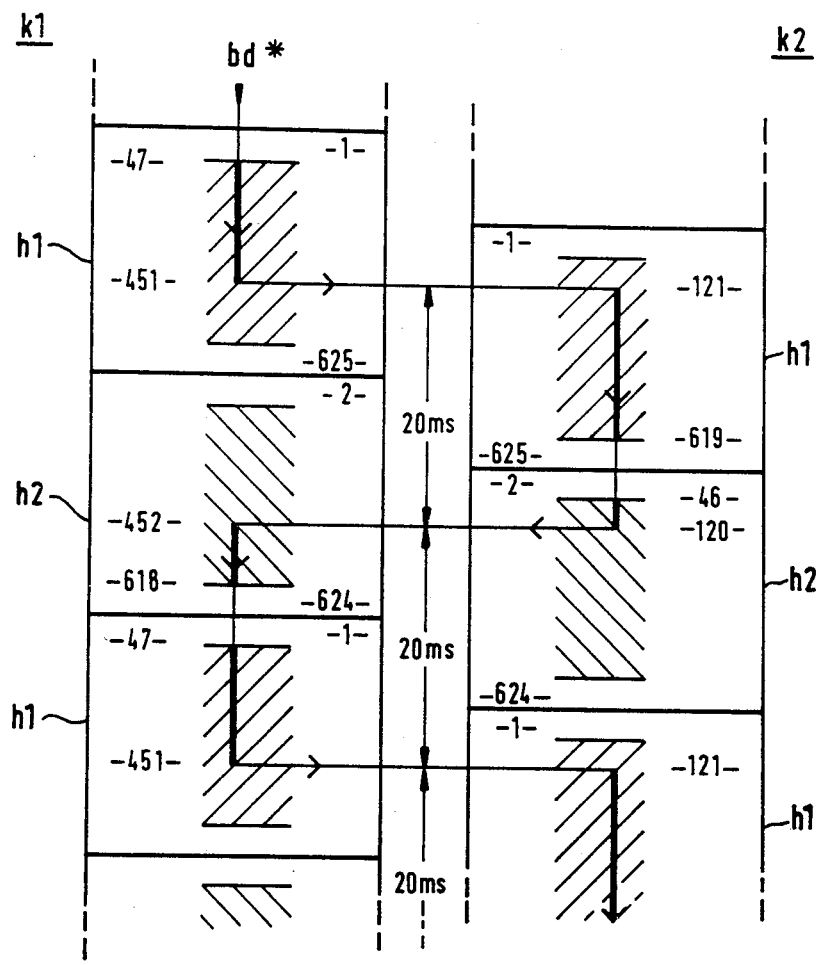
FIG. 3a shows the sampling scheme for two television channels each consisting of an alternating sequence of even-and odd-numbered fields.

FIG. 3a shows an embodiment of the sampling scheme of two television channels k1, k2 of a 625-line standard with 25 blanked lines per field. The respective fields h1, h2 are shown one above the other, with the odd-numbered field h1 containing the odd-numbered lines, and the even-numbered field h2 the even-numbered lines. The schematic course of the sampling of the two television channels k1, k2 is indicated by the meander line bd*, which runs between the two television channels k1, k2. The first memory area 166 is used for the first television channel k1, and the fourth memory area 172 for the second television channel k2. The receive period is 20 ms, after which the received televisions channel is switched to the other channel. The sampling beginnings with line 1 in the odd-numbered field h1 of the television channel k1, and lines 47 to 451 of this field are stored. Then, the television channel k2 is turned on, whose phase position is such that the 121st line of the odd-numbered field h1 can just be written in. This field h1 is stored until line 619 inclusive. During the retrace period, no storage takes place. Of the even-numbered field h2, the 46th to the 120th lines are then stored at the corresponding locations of the fourth memory area 172. Another switchover to the television channel k1 finds the line 452 in the even-numbered field h2, after which this field is written in until line 618 inclusive. During the retrace period, no storage takes place. The new odd-numbered field h1 is again written in with line 47, and the sampling process continues periodically in this manner.

For simplicity, in FIG. 3a, only the area between the line 46, 47 and 618, 619 has been included in the storage process. The memory area required for the video signal sources thus decreases by the retrace lines without picture information.

FIG. 3b shows schematically how the storage process of FIG. 3a takes place in the RAM 164. The first memory area 166 shows a stored line combination from the odd-numbered field h1 and the even-numbered field h2 of the first television channel k1. In the fourth memory area 172, the corresponding stored lines of the television channel k2 are shown, again a combination from the odd-numbered field h1 and the even-numbered field h2. The memory areas ss2, ss3 contain "old" picture data and are not involved in the above-described video-signals switching but may contain, for example, a previously taken "snapshot" or a still picture which is then presented as part of the multipicture display.

The sampling scheme of FIG. 3a is the associated memory content of FIG. 3b also show that the size and arrangement of the different parts of the picture which are stored in the individual memory areas 166, 168, 170, 172 change only slightly, if at all, within a few multipicture display periods. This results if the phases of the video signals involved drift past each other, so that the relative phase position of the fields h1, h2 of the video signals gradually changes.

Unlike the circuit described in Offenlegungsschrift DE No. 24 13 839, all video signals to be reproduced are first written into a memory area 166, 168, 170, 172 and then read out for display. No distinction is made between a main program and a secondary program. The respective picture reproduction in the subareas 192, 194, 196 and 198 corresponds to the picture data read from the respective memory areas 166, 168, 170, and 172. The switching and storage process has thus become highly variable in time, for the duration of the receive periods is variable within a wide range-from the duration of a line up to the duration of a field-without this resulting in a superposed interference pattern on the screen because of missing lines or missing line blocks. The more video signals are to be reproduced, the clearer the improvement over the method disclosed in the above Offenlegungsschrift, in which the number of missing lines in the main picture would increase intolerably if there were several secondary pictures. Therefore, that method is applicable in practice to a single secondary picture at best.

The RAM 162 shown in the schematic presentation of FIG. 1 is a "dual-port RAM" with separate read and write cycles, which has a data bus for the picture data to be stored, bd, or bd', a data bus 210 for the picture data read out, a data bus 212 for the write addresses, a data bus 214 for the read addresses, an input 216 for the write signal tw, and an input 218 for the read signal tr.

Direct realization of this arrangement with currently availably RAMs, particularly with the currently standardized and, therefore, less expensive dynamic RAMs (dynamic RAM=DRAM) is not possible because the above described function separation is not provided for.

With the specific "dual-port DRAM" MB 81461-12, the function separation is possible in a slightly modified form, for this commercially available memory module includes all separate functional units except a separate address bus. In addition, this dual-port DRAM permits fast reloading of stored data blocks from the actual memory area to an integrated buffer. From the latter, the stored picture data br for the multipicture display are then read strictly sequentially, so that the common address bus is free for the loading process during that time.

Figure 4:
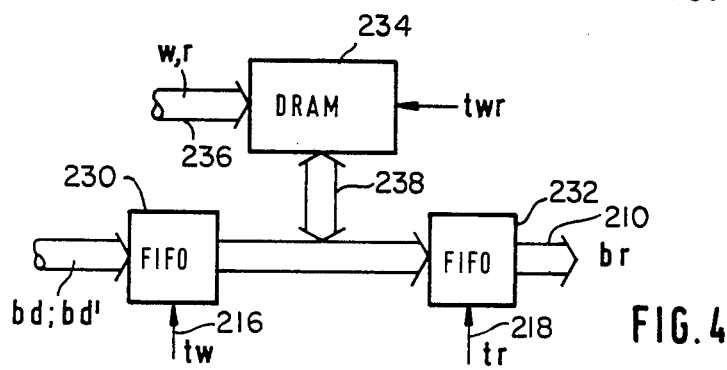
FIG. 4 is a block diagram of RAM.

FIG. 4 shows a somewhat more sophisticated realization with two so-called first-in, first-out buffers (FIFO buffers) 230, 232, which, however, allows the use of standardized DRAMs 234 with a common address bus 236 and a common data bus 238. Such FIFO buffers 230, 232 (example of a commercially available type: TDC 1030) convert the bidirectional data bus 238 functionally into two isolated data busses for simultaneous write-in and readout of data.

The output of the first FIFO buffer 230 and the input of the second FIFO buffer 232 are connected to the bidirectional data bus 238 of the DRAM 234. The first FIFO buffer 230 is supplied with the write signal tw, and the second FIFO buffer 232 with the read signal tr. The writing of the picture data bd, bd' into the first FIFO buffer 230 and the reading of the stored picture data br from the second FIFO buffer 232 are thus isolated from each other.

The fast block-by-block reloading of the data stored in the first FIFO buffer 230 into the DRAM 234 takes place via the bidirectional data bus 238, with the write addresses w entered as block addresses over the address bus of the DRAM 234, and thus represents the actual loading process of the DRAM 234. The clock signal supplied to the DRAM 234 is the read/write signal twr.

Data is read out of the DRAM 234 over the bidirectional data bus 238 in blocks which are temporarily stored in the second FIFO buffer 232, with the read addresses r entered as block addresses over the address bus 236 of the DRAM 234, and the clock signal being the rear/write signal twr. For the multipicture display, the readout of the stored picture data br from the second FIFO buffer 232 then takes place strictly sequentially for the scanning lines to be displayed.

What is claimed is:

1. A television receiver in which a single video signal can be reproduced simultaneously in at least two subareas of a picture screen, or at least two different video signals can each be reproduced in different subareas, with each subarea displaying either a reduced size picture or part of the picture supplied by a video signal source, said receiver comprising:

a digital signal processing circuit for receiving signals from a plurality of video signal sources and converting said signals to picture data comprising luminance and color data for each picture element;

a random access memory for storing picture data for an entire screen;

a control unit for controlling the writing of picture data into an area of said random access memory, the area being selected depending on how many of said different video signals are to be reproduced on said picture screen and also depending upon an order by which lines of picture data are read from said random access memory, only selected lines being transferred from said video signal sources into associated areas of said random access memory;

a digital to analog converter which receives picture data read from said random access memory and which generates therefrom analog red, green and blue signals;

line counters, each having its respective count outputs coupled to said control unit, said line counters each being associated with one of said video signal sources and each being advanced between received periods such that at the beginning of a receive period it has a count corresponding to the line being received from the respective video signal source;

a sensing circuit for sensing horizontal and vertical synchronizing pulses received in receive periods of said video signal sources to synchronize said line counters; and a signal source counter connected to said control unit that causes said control unit to periodically switch between selected ones of said video signal sources.

2. A television receiver in accordance with claim 1, comprising:

a single radio-frequency receiver receiving at least two television channels originating as video signals from a single video-signal source said radio frequency receiver being switched by said control unit to a frequency range of a corresponding television channel for the duration of one receive period which starts with the beginning of a complete scanning line, lasts at least one line period, and, if all receive periods of a switching cycle are approximately equally long, does not exceed the duration of a received field.

3. A television receiver in accordance with claim 1, wherein: a field stored in a memory area is composed of parts originating at a receiving end from odd-and even-numbered fields the size and the arrangement of the various parts of the field changing at most only slightly within a few multipicture display periods.

4. A television receiver in accordance with claim 1, wherein said control unit causes at least one video signal to be displayed in a selected subarea of the screen to be skipped and displays a still picture in said selected subarea.

5. A television receiver in accordance with claim 1, wherein:

a frequency at which switching of video signals of at least one subarea is adjustable to obtain a lower frame frequency.

6. A television receiver in accordance with claim 1 wherein:

said random access memory comprises at least one DRAM having a common bidirectional data bus and a common address bus for providing write addresses and read addresses to said DRAM to select a storage location within said DRAM, and at least one first FIFO (first-in first-out) buffer and one second FIFO buffer;

said bidirectional data bus being connected to a data output of said first FIFO buffer and to a data input of second FIFO buffer;

said first FIFO buffer having a data input supplied with picture data, and having clock input receiving a write signal;

said second FIFO buffer having an output which delivers picture data which is read out under control of a read signal and wherein during writing into and reading from said DRAM, data is transferred block by block over said bidirectional data bus, respective write addresses and read addresses are applied over said common address bus, and a read/write signal is supplied to said DRAM.

7. A television receiver in accordance with claim 1, wherein said plurality of video signal sources indicate at least one television channel.

* * * * *